UNITED STATES PATENT OFFICE.

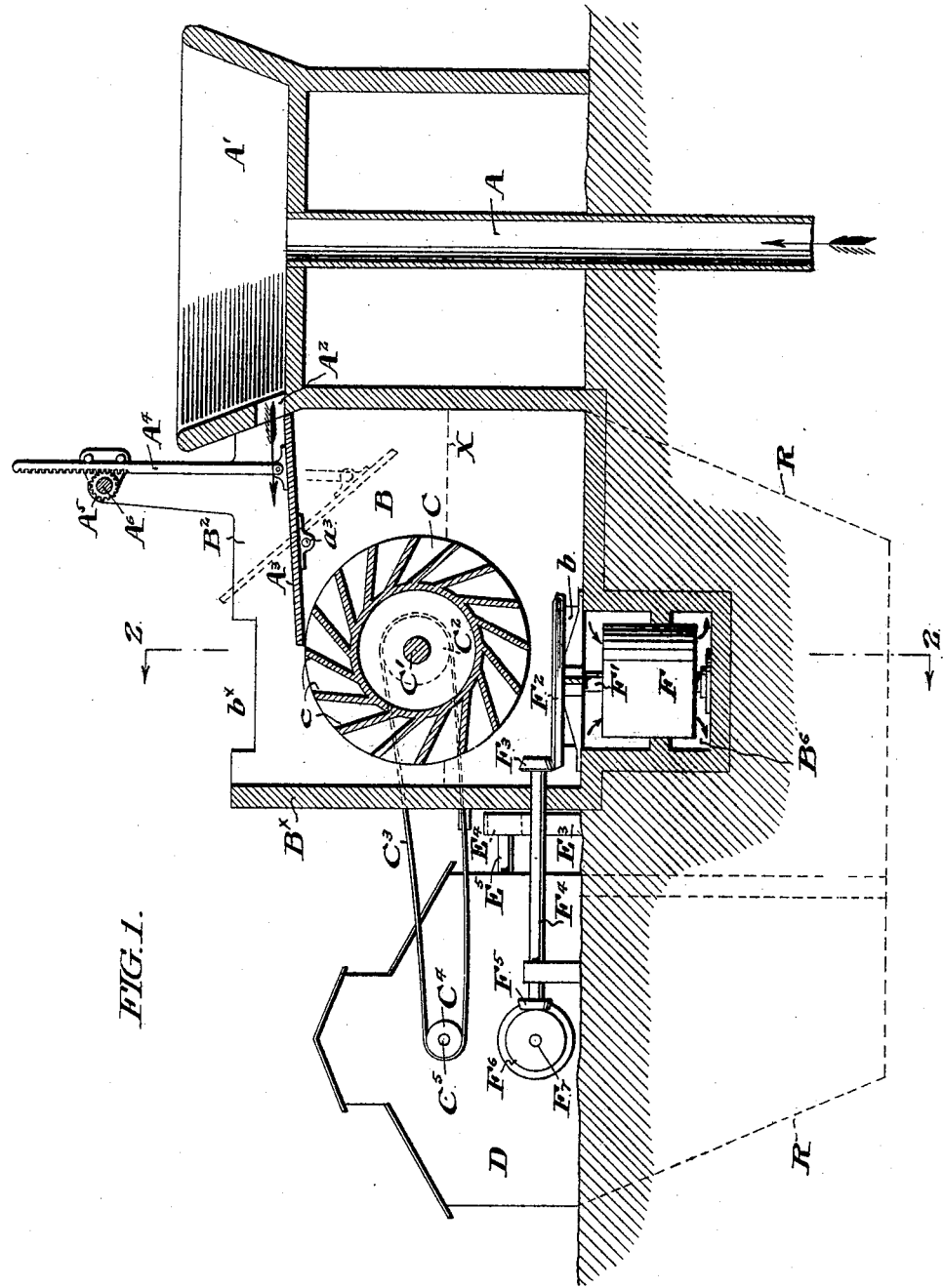

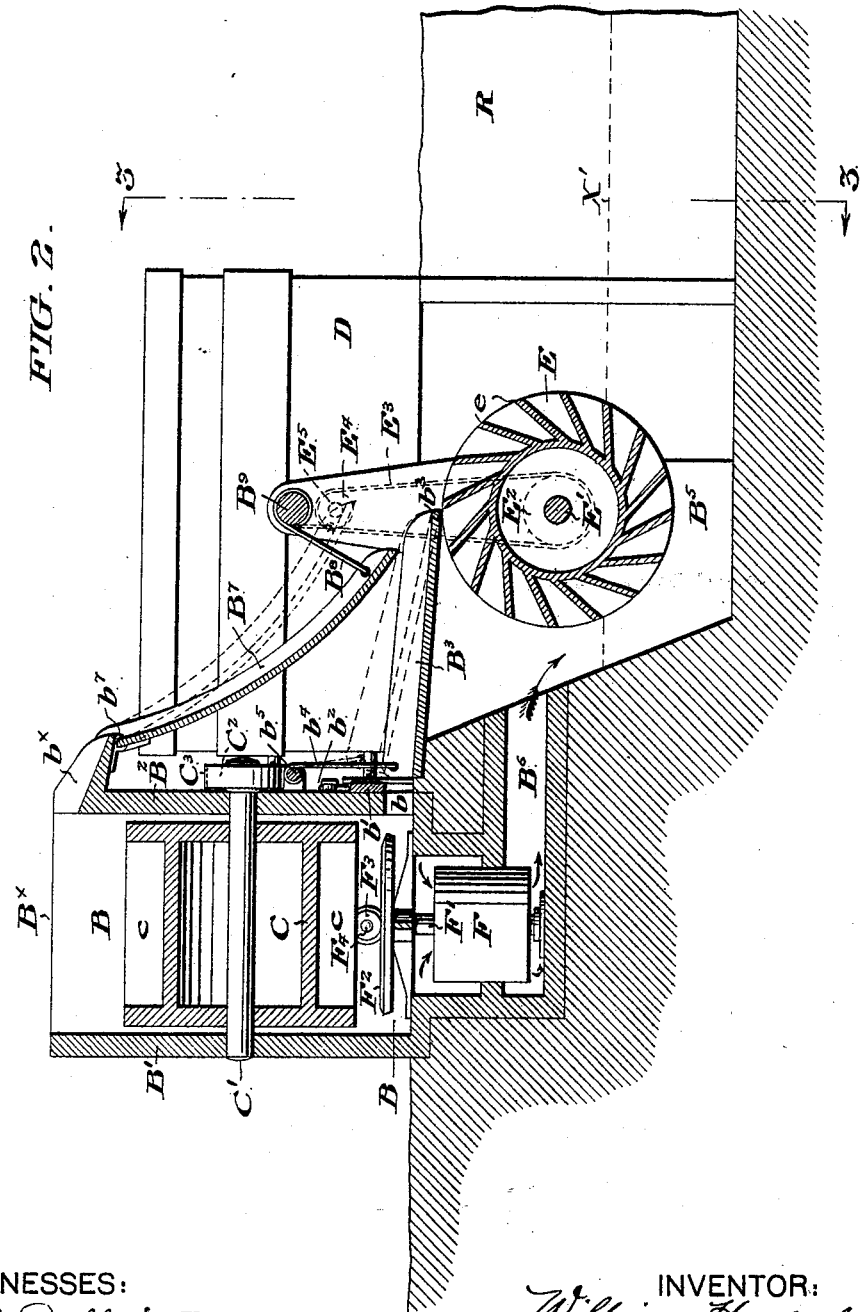

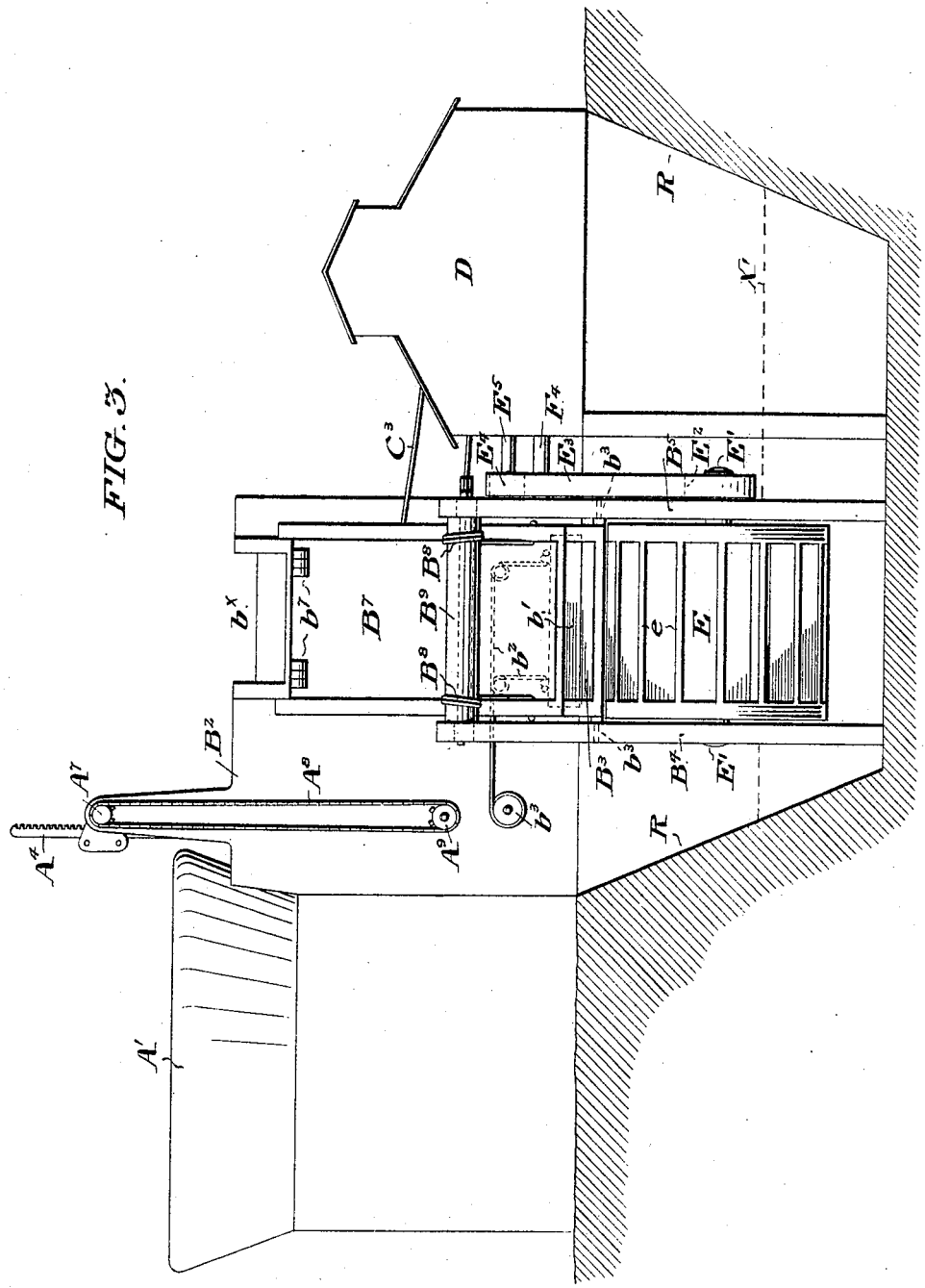

WILLIAM HAYWOOD, OF PHILADELPHIA, PENNSYLVANIA, ASSIGNOR OF ONE-HALF TO AARON HEISER, OF SAME PLACE.

HYDRAULIC MOTOR.

SPECIFICATION forming part of Letters Patent No. 619,479, dated February 14, 1899.

Application filed January 19, 1898. Serial No. 667,132. (No model.)

*To all whom it may concern:*

Be it known that I, WILLIAM HAYWOOD, of Philadelphia, in the State of Pennsylvania, have invented certain new and useful Improvements in Hydraulic Motors, whereof the following is a specification, reference being had to the accompanying drawings.

My invention relates to motors operated by water-pressure, and is primarily addressed to the adaptation of such motors to a particular environment.

Ordinarily the supply of water for a city is furnished from a reservoir located at such a height as to give the desired pressure within the city pipes, said water being primarily supplied to said reservoir by suitable pumping machinery. As ordinarily constructed such a water-supply plant comprises pumping machinery adapted to raise the water to a level considerably above that of the average level of water in the reservoir. The delivery-outlet from said pumping machinery being fixed in the construction of the plant said machinery must deliver water at said level irrespective of the rise and fall of the water in the reservoir.

It is the object of my invention to locate a hydraulic motor between the highest level of the supply-pipe leading from the pumping machinery and the line of lowest water-level in the reservoir, so that power may be derived from the fall of water from said supply-pipe level to said reservoir-level.

It is the further object of my invention to utilize such available mechanical force by any convenient means—such as its conversion into electrical energy for a supply of light, &c.—and to locate said means within a power-house built to overhang the reservoir to economize ground area.

In the drawings, Figure 1 is a central longitudinal section through my improved motor, showing its relation to said supply-pipe and reservoir. Fig. 2 is a transverse sectional view taken on the line 2 2 of Fig. 1, in the direction of the arrows upon said line. Fig. 3 is a sectional view taken on the line 3 3 of Fig. 2, in the direction of the arrows upon said line.

In said figures, A is the supply-pipe, A' is the basin surrounding the upper extremity of said pipe, and $A^2$ is an outlet from said basin leading into the motor-chamber B.

C is an overshot water-wheel fixed upon the shaft C'. Said shaft C' is mounted for rotation in the side walls B' and $B^2$ of said chamber B and provided exterior to the wall $B^2$ with a wheel $C^2$, connected by a belt $C^3$ with the wheel $C^4$, fixed upon the shaft $C^5$, extending within the power-house D.

The chute $A^3$ is pivoted at $a^3$ in the side walls B' and $B^2$ and in its upper position serves to deliver the water from the outlet $A^2$ in proper position to impinge upon the blades $c$ of the wheel C and rotate the latter.

The water flowing as aforesaid to the wheel C in the chamber B flows thence through the outlet $b$ in the side wall $B^2$ and down the chute $B^3$, hingedly secured at $b^3$ in the motor-housings $B^4$ and $B^5$. Said chute serves to deliver the water from the chamber B in proper position to impinge upon the blades $e$ of the overshot wheel E, fixed upon the shaft E'. Said shaft E' is mounted for rotation in the housings $B^4$ and $B^5$ and provided exterior to said housing $B^5$ with a wheel $E^2$, which is connected by the belt $E^3$ with the wheel $E^4$ upon the shaft $E^5$, extending within the power-house D. In the bottom of said chamber B I mount the turbine F, the casing thereof being fixed with relation to the chamber B, so that water from the latter passes through said casing into the outlet passage-way $B^6$ and thence into the reservoir. The bevel gear-wheel $F^2$ is fixed upon the turbine-shaft F' and transmits motion from said shaft F' through the gear-wheel $F^3$, fixed upon the shaft $F^4$, the latter being mounted for rotation in the end wall $B^\times$ of the chamber B. Said shaft $F^4$ is provided upon its opposite extremity with the gear-wheel $F^5$, in mesh with the gear-wheel $F^6$ upon the shaft $F^7$, extending within the power-house D. It is therefore obvious that the water flowing from the delivery-pipe A down the chute $A^3$ serves to operate the wheels C and E and the turbine F before its final delivery to the reservoir R.

The quantity of water flowing from the outlet $b$ may be regulated by means of the drop-gate $b'$, which is conveniently provided with chains $b^2$ and a windlass $b^3$, by which it may be raised and lowered. If desired, said gate $b'$ may be shut and all of the water from the chamber B be discharged through the turbine F.

The chute $B^3$ may be lifted into the position indicated in dotted lines in Fig. 2 by means of the chain $b^4$ and windlass $b^5$ when it is desired to stop the operation of the wheel E.

The operation of the wheel C may be stopped by tilting the chute $A^3$ upon its pivotal connection $a^3$. Said chute is provided with a rack-bar $A^4$, in engagement with the gear $A^5$, fixed upon the shaft $A^6$. Said shaft $A^6$ extends through suitable bearings in the side wall $B^2$ and, being provided with a sprocket-wheel $A^7$ exterior to the latter, is conveniently operated by means of the chain $A^8$ and windlass $A^9$. Said wheel C may be thrown out of operation, as aforesaid, and the water allowed to rise in said chamber B to operate said wheel E and turbine F with increased force, the water issuing to the wheel E, as aforesaid, down the chute $B^3$, or the gate $b'$ may be closed and the full water-pressure in the chamber B be concentrated upon the turbine F.

The chamber B is provided with an outlet $b^\times$ at the top of the wall $B^2$. The chute $B^7$ is hinged to said outlet $b^\times$ at $b^7$ and may be conveniently adjusted by the chains $B^8$, connecting with the windlass $B^9$, the latter being mounted in suitable bearings upon the housings $B^4$ and $B^5$. When said chute is in the position shown in full lines in Fig. 2, the water overflowing from the top of the chamber B through $b^\times$ is delivered in position to impinge upon the blades $e$ of the wheel E. When, however, said chute $B^7$ is raised to the position indicated in dotted lines in said figure, said overflow of water is delivered directly into the reservoir.

It is obvious that various modifications may be made without departing from the spirit of my invention. I therefore do not desire to limit myself to the precise details of construction which I have shown and described.

I claim—

1. In a hydraulic motor, the combination with a water-chamber B, of an overshot wheel C, mounted in said chamber above its bottom, a turbine F, mounted in the bottom of said chamber, the water-inlet $A^2$, to said chamber, the outlet passage-way $B^6$, the chute $A^3$, pivoted in said chamber, and means to tilt said chute, substantially as and for the purpose set forth.

2. The combination with the water-chamber B, of the overshot water-wheel E, the water-inlet $A^2$, the outlet $b^\times$, at the top of said chamber, the outlet $b$, at the bottom of said chamber, pivoted chutes $B^7$, and $B^3$, for said respective outlets, and means to tilt said chutes with respect to the overshot wheel E, substantially as and for the purpose set forth.

WILLIAM HAYWOOD.

Witnesses:
HERMAN C. HORN,
ARTHUR E. PAIGE.